US010246618B2

(12) United States Patent
Eustache et al.

(10) Patent No.: US 10,246,618 B2
(45) Date of Patent: Apr. 2, 2019

(54) PEBA FOR DIRECT ADHESION TO TPE

(71) Applicant: ARKEMA FRANCE, Colombes (FR)

(72) Inventors: René-Paul Eustache, Combon (FR); Mathieu Sabard, Serquigny (FR); Yves Deyrail, Aviron (FR); Quentin Pineau, Evreux (FR); Inci Turan-Altuntas, Val de Reuil (FR); Martin Pouzet, Higashigekko-Cho (JP); Atsushi Yoshitake, Kyoto (JP)

(73) Assignee: Arkema France, Colombes (FR)

( * ) Notice: Subject to any disclaimer, the term of this patent is extended or adjusted under 35 U.S.C. 154(b) by 0 days.

(21) Appl. No.: 15/192,276

(22) Filed: Jun. 24, 2016

(65) Prior Publication Data

US 2016/0376483 A1  Dec. 29, 2016

(30) Foreign Application Priority Data

Jun. 26, 2015  (FR) .................................... 15 56000

(51) Int. Cl.
| | |
|---|---|
| *B32B 7/12* | (2006.01) |
| *C09J 187/00* | (2006.01) |
| *C08G 69/40* | (2006.01) |
| *C08L 77/06* | (2006.01) |
| *B32B 27/08* | (2006.01) |
| *B32B 27/28* | (2006.01) |
| *B32B 27/34* | (2006.01) |
| *B32B 37/06* | (2006.01) |
| *C08G 81/00* | (2006.01) |
| *C09J 5/06* | (2006.01) |

(52) U.S. Cl.
CPC ............ *C09J 187/005* (2013.01); *B32B 7/12* (2013.01); *B32B 27/08* (2013.01); *B32B 27/285* (2013.01); *B32B 27/34* (2013.01); *B32B 37/06* (2013.01); *C08G 69/40* (2013.01); *C08G 81/00* (2013.01); *C08L 77/06* (2013.01); *C09J 5/06* (2013.01); *B32B 2371/00* (2013.01); *B32B 2377/00* (2013.01); *B32B 2437/02* (2013.01); *C08G 2170/20* (2013.01); *C08G 2170/90* (2013.01); *C09J 2475/006* (2013.01)

(58) Field of Classification Search
CPC ............ B32B 2371/00; B32B 2377/00; B32B 2437/02; B32B 27/08; B32B 27/285; B32B 27/34; B32B 37/06; B32B 7/12; C08G 2170/20; C08G 2170/90; C08G 69/40; C08G 81/00; C08L 77/06; C09J 187/005; C09J 2475/006; C09J 5/06
See application file for complete search history.

(56) References Cited

U.S. PATENT DOCUMENTS

| | | |
|---|---|---|
| 6,590,065 B1 | 7/2003 | Goldfinger |
| 2005/0165210 A1 | 7/2005 | Malet et al. |
| 2013/0296502 A1 | 11/2013 | Malet et al. |

FOREIGN PATENT DOCUMENTS

| | | |
|---|---|---|
| EP | 0 179 700 A1 | 4/1986 |
| EP | 0 197 845 A1 | 10/1986 |
| EP | 0 679119 A1 | 11/1995 |
| FR | 2 897 335 A1 | 8/2007 |
| FR | 3 001 550 A1 | 4/2015 |
| WO | WO 95/12481 A1 | 5/1995 |
| WO | WO 03/050159 A1 | 6/2003 |
| WO | WO 2004/037898 A1 | 5/2004 |

OTHER PUBLICATIONS

Malet (WO 2015052127 A1), Apr. 16, 2015.*
Extended European Search Report dated May 9, 2016, by the French Patent Office in corresponding France Patent Application No. 15 56000.

* cited by examiner

Primary Examiner — Lawrence D Ferguson
(74) Attorney, Agent, or Firm — Thomas F. Roland

(57) ABSTRACT

The invention relates to a copolymer having polyamide PA blocks and polyether PE blocks, in which PA is of diamine.diacid X.Y type; X, the number of carbons of the diamine, is within the range from 6 to 14, and Y, the number of carbons of the diacid, is within the range from 6 to 18. The invention also relates to the use of the said copolymer in a process of direct adhesion between two TPE materials for increasing the peel strength between these materials.

7 Claims, 1 Drawing Sheet

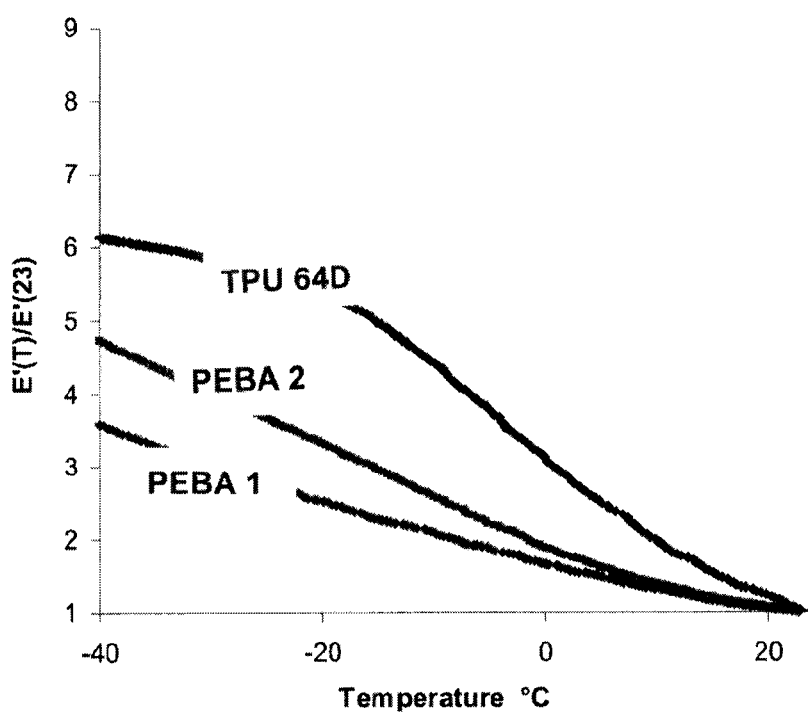

PEBA FOR DIRECT ADHESION TO TPE

FIELD OF THE INVENTION

The present invention relates to a novel copolymer having polyamide PA blocks and polyether PE blocks (abbreviated to PEBA) which is particularly well suited to the process of direct adhesion to a substrate based on thermoplastic elastomer (abbreviated to TPE), in particular to TPU.

The present invention also relates to the assembling by direct adhesion of a first substrate based on PEBA according to the invention (C1) and of a second substrate (C2), it being possible for the substrates to be of the same nature or of different nature. In addition, the present invention relates to a laminated product formed by the assembling of such substrates by direct adhesion.

The present invention relates in particular to a process for the manufacture of such a laminate and to its use in the footwear industry, in particular for the manufacture of soles and very particularly of sports shoe soles.

TECHNICAL BACKGROUND

One of the main areas of expertise of the footwear industry is good control of the adhesive bonding techniques intended to assemble materials of different chemical natures and with different mechanical properties. This expertise is particularly important in the field of sports shoes, where the materials used, in particular for the manufacture of the soles, are frequently novel materials. This requirement is magnified by the search for performance generally related to the sports shoe.

During the last decade, materials based on TPE, such as the PEBA materials sold by Arkema under the Pebax® trademark, have gradually become established in the field of top of the range footwear, in particular sports shoes, by virtue of their mechanical properties and in particular their exceptional resilience property. Specifically, PEBAs can advantageously be used in sports shoes as sole of "semi-rigid" type (football, baseball, and the like) or flexible type (jogging), making it possible to directly produce the internal sole (damping) and/or the external sole (abrasion resistance-stiffness).

The assembling of TPE on TPEs of the same nature or with different compositions is obtained by moulding or extruding, possible cutting up of the components and then adhesively bonding and pressing these components, or also by direct adhesion of these TPEs.

The term "direct adhesion process" is understood to mean an adhesion process without contribution of binder, in particular contribution of adhesive. In comparison with conventional adhesive bonding processes involving a multitude of complicated stages generally using adhesives based on organic solvents, direct adhesion processes are more ecological and non-polluting.

Mention may be made, as examples of direct adhesion process, of: overmoulding, hot pressing, coextrusion, thermoforming, two-material injection moulding, co-injection moulding and any other possible adhesion method using one or more of the conventional methods, such as injection moulding, extrusion moulding and/or blow moulding.

This cohesion between the materials is rendered possible by the adhesive properties which the polymers possess in the molten state. For example, the patent document EP197845 describes a process for assembling surfaces by application of a PEBA seal and melting of its surface layer. The patent document EP179700 describes an adhesive composition comprising a PEBA and its use as pressure-sensitive adhesive. The patent document EP0679119 describes a two-layer object comprising a lightened thermoplastic elastomer of polyetheramide type which adheres by itself to a non-lightened thermoplastic which can be chosen from polyetheramides, polyetheresters or polyurethanes.

The overmoulding technique consists of the injection of substance over an insert placed at the bottom of the mould. The cohesion of the two materials is obtained by the hot melt and compatibility properties of the overmoulded substance and of the insert. PEBAs are very well suited to this overmoulding technique as they have a broad plasticizing range, making it possible to optimize the adhesion of the substance and of the inserts and to avoid the use of adhesive.

Unfortunately, the levels of adhesion, expressed by the peel strength, of the TPE-based substrates of the systems of the prior art obtained by direct adhesion are far from being optimal. Thus, with some of the PEBA substrates with a Shore D hardness of 60 to 65 on average (for example Pebax® 6333), at best weak peel strengths of 3 kg/cm are obtained. In point of fact, footwear manufacturers require, for some applications, a peel strength of at least 5, preferably of at least 8, indeed even of at least 10 kg/cm.

It is thus an aim of the present invention to provide a PEBA with properties of improved direct adhesion to TPE substrates and in particular to TPU.

Another aim of the present invention is to provide a laminate comprising at least one PEBA-based substrate and also a process for the manufacture of such a laminate by direct adhesion, the laminate having to exhibit a peel strength of greater than 3 kg/cm, preferably of at least 5 kg/cm, preferably of at least 8 kg/cm, indeed even of at least 10 kg/cm, measured according to Standard ISO 11339.

A further aim of the present invention is to increase the level of adhesion of TPE materials without detrimentally affecting their mechanical properties.

The Applicant Company has now developed a novel type of PEBA which exhibits a markedly better direct adhesion to TPE than that of the existing PEBAs, with a peel strength of greater than 10 kg/cm, while retaining excellent mechanical properties, such as good liveliness, a low density and low cold stiffening.

SUMMARY OF THE INVENTION

The invention relates first to a copolymer having polyamide PA blocks and polyether PE blocks, in which PA is of X.Y type; X, the number of carbons of the diamine, is within the range from 4 to 14, preferably from 6 to 14, and preferably from 6 to 12, and Y, the number of carbons of the diacid, is within the range from 6 to 18, preferably from 6 to 12 and preferably from 10 to 12.

Advantageously, X is chosen from 6 or 10, and Y is chosen from 10 or 12; preferably, PA X.Y is PA 6.10 or PA 6.12, preferably PA 6.10.

Advantageously, PE is chosen from PTMG, PPG, PO3G and/or PEG and is preferably chosen from PTMG, PPG and/or PO3G.

Preferably, the copolymer according to the invention is chosen from the PEBA PA6.10-PTMG or PA6.12-PTMG, preferably PA6.10-PTMG.

Advantageously, the said copolymer comprises from 51 to 90% by weight, preferably from 60 to 90% by weight and preferably from 65 to 85% by weight of polyamide blocks and respectively from 49 to 10% by weight, preferably from 40 to 10% by weight and preferably from 35 to 15% by weight of polyether blocks, with respect to the total weight of copolymer.

Advantageously, the number-average molecular weight (Mn) of the PA blocks is within the range from 500 to 10 000, preferably from 1000 to 10 000, preferably from 2000 to 9000, preferably from 2000 to 6000, preferably from 2000 to 3000 and preferably from 2500 to 3000.

Advantageously, the number-average molecular weight (Mn) of the PE blocks is within the range from 400 to 1000, preferably from 500 to 1000, preferably from 600 to 700, indeed even from 600 to 650.

Another subject-matter of the present invention is the use of a PEBA in a process of direct adhesion between two TPE materials for increasing the peel strength between these materials, characterized in that the PEBA is a copolymer according to the invention described above.

A subject-matter of the present invention is in particular a composition based on copolymer according to the invention described above, the composition being characterized in that it comprises:
  from 51 to 99.9% by weight of the said copolymer,
  from 0.1 to 49% by weight of at least one other component chosen from: PEBAs with a different composition and/or with a different flexural modulus from that of the copolymer, PAs, POFs, COPEs, TPUs, reinforcing fillers and/or fibres, in particular of glass or of carbon, colourants, UV absorbers, antioxidants, in particular phenolic antioxidants or antioxidants based on phosphorus or based on sulphur, light stabilizers of hindered amine or HALS type, and their mixtures.

A further subject-matter of the present invention is a process for direct adhesion of a copolymer material (C1) according to the invention with a TPE copolymer material (C2), C2 being of identical composition to and having the same flexural modulus as C1, or else being of identical composition to but having a different flexural modulus from C1, or else C2 is a TPE material chosen from: PEBAs of different compositions from that of the said copolymer C1, COPEs and/or TPUs, the process according to the invention being characterized in that the assembling is carried out by a process comprising the heating of at least one of the two copolymer materials C1 and/or C2, so as to cause one material to adhere to the other.

According to an advantageous embodiment of the process of the invention, the material C1 is melted or softened under heating and the molten material C1 is brought into contact with at least a portion of the material C2 of the series of the thermoplastic polyurethanes TPUs in order to cause the two materials to adhere.

According to a second advantageous embodiment of the process of the invention, the material C2 of the series of the thermoplastic polyurethanes TPUs is melted or softened under heating and the molten material C2 is brought into contact with at least a portion of the material C1 in order to cause the two materials to adhere.

According to a third advantageous embodiment of the process of the invention, the material C1 and the material C2 of the series of the TPUs are independently melted or softened under heating and the molten material C1 is brought into contact with at least a portion of the molten material C2 in order to cause the two materials to adhere.

Advantageously, in the assembling in process according to the invention, the material C1 and the material C2 are assembled by a direct adhesion process chosen from: overmoulding, hot pressing, coextrusion, thermoforming, injection moulding, extrusion moulding, blow moulding and their mixtures, preferably by overmoulding one material over the other, preferably by overmoulding the copolymer according to the invention over a TPE and preferably by overmoulding the copolymer over a TPU.

Advantageously, the assembling temperature of the direct adhesion process according to the invention is within the range from 220 to 300° C., preferably from 250 to 290° C. and preferably from 270 to 290° C.

Another subject-matter of the present invention is a composite article comprising at least two polymer materials which adhere directly to one another, one with a composition in accordance with the invention described above and the other made of TPE chosen from identical PEBA (with a flexural modulus different from that of the copolymer), PEBA of composition different from that of the said copolymer, COPE and/or TPU.

Another subject-matter of the present invention is the use of an article according to the invention in the manufacture of sports equipment, of a component of footwear, in particular of sports shoe, shoe sole, in particular crampon, component of a ski, in particular of a ski boot or of a ski shell, of a medical device, of a transmission belt, as antistatic additive, as waterproof-breathable film, as support for active molecules, as colouring agent, as welding agent, as decorative element and/or as additive for polyamide.

The present invention makes it possible to overcome the disadvantages of the state of the art. It more particularly provides a PEBA capable of adhering directly to TPU, by heating, without decomposing the materials to be assembled, while contributing good liveliness, a low density and low cold stiffening to the laminated material thus obtained.

This is accomplished by virtue of the use of the specific PEBA according to the invention. This result is surprising in so far as polycondensed thermoplastic elastomer polymers of high hardness (60 to 65 Shore D) are generally difficult to assemble by direct adhesion in a way which is both effective and lasting to TPU.

BRIEF DESCRIPTION OF THE DRAWINGS

FIG 1: is a plot of the cold stiffening as measured by the change in the E' modulus (MPa) as a funcation of temperature T or by the change in the □E'(T)/E'(23° C) ratio as a function of the temperature over the range −40° C to +23° C.

DESCRIPTION OF EMBODIMENTS OF THE INVENTION

In the present description, it is specified that, when reference is made to intervals, the expressions of the "ranging from . . . to" or "comprising from . . . to" type include the limits of the interval. Conversely, the expressions of the "of between . . . and . . . " type exclude the limits of the interval.

Unless otherwise mentioned, the percentages expressed are percentages by weight. Unless otherwise mentioned, the parameters to which reference is made are measured at atmospheric pressure and ambient temperature (20-25° C., generally 23° C.).

The invention is now described in more detail and without implied limitation in the description which follows.

The term "thermoplastic elastomer polymer", abbreviated to "TPE", denotes a polymer which constitutes a multiphase material exhibiting at least two transitions, namely a first transition at a temperature T1 (this is generally the glass transition temperature) and a second transition at a temperature T2 greater than T1 (this is generally the melting point). The material is rigid at a temperature below T1, has an elastic behaviour between T1 and T2 and is molten above T2. Such a specific polymer combines the elastic behaviour of materials of rubber type with the ability for conversion of thermoplastics.

The PEBA According to the Invention Used as Material or Substrate C1

A subject-matter of the invention is a specific copolymer having polyamide PA blocks and polyether PE blocks (PEBA) selected for its ability to directly adhere to another TPE by simple heating.

This PEBA according to the invention has the essential characteristic of comprising polyamide PA blocks of X.Y type, in which X, the number of carbons of the diamine, is within the range from 4 to 14, preferably from 6 to 14, and Y, the number of carbons of the diacid, is within the range from 6 to 18.

X is preferably chosen from 6 or 10 and Y is chosen from 10 or 12; preferably, the PA X.Y is PA 6.10 or PA 6.12, preferably PA 6.10.

Advantageously, the number-average molecular weight (Mn) of the PA blocks is within the range from 500 to 10 000, preferably from 1000 to 10 000, preferably from 2000 to 9000, preferably from 2000 to 6000, preferably from 2000 to 3000 and preferably from 2500 to 3000.

As regards the PE blocks of the PEBA according to the invention, PE is chosen from PTMG, PPG, PO3G and/or PEG and is preferably chosen from PTMG, PPG and/or PO3G.

Advantageously, the number-average molecular weight (Mn) of the PE blocks is within the range from 400 to 1000, preferably from 500 to 1000, preferably from 600 to 700, indeed even from 600 to 650.

Advantageously, the said copolymer comprises from 51 to 90% by weight, preferably from 60 to 90% by weight and preferably from 65 to 85% by weight of polyamide blocks and respectively from 49 to 10% by weight, preferably from 40 to 10% by weight and preferably from 35 to 15% by weight of polyether blocks, with regard to the total weight of the copolymer.

Other TPEs Used as Material or Substrate C2

The other TPEs used in the context of the invention can be chosen from the group consisting of copolyether-block-amides, copolyether-block-urethanes, copolyester-block-urethanes and copolyether-block-esters, and combinations of these. The general definition of each of these TPEs is restated below.

Copolyether-block-amides, also known as copolymers having polyether blocks and polyamide blocks, or "PEBA" as an abbreviation, result from the polycondensation of polyamide blocks having reactive ends with polyether blocks having reactive ends, such as, inter alia:

1) polyamide blocks having diamine chain ends with polyoxyalkylene blocks having dicarboxylic chain ends;

2) polyamide blocks having dicarboxylic chain ends with polyoxyalkylene blocks having diamine chain ends, obtained by cyanoethylation and hydrogenation of α,ω-dihydroxylated aliphatic polyoxyalkylene blocks, known as polyether diols;

3) polyamide blocks having dicarboxylic chain ends with polyether diols, the products obtained being, in this particular case, polyetheresteramides.

The polyamide blocks having dicarboxylic chain ends originate, for example, from the condensation of polyamide precursors in the presence of a chain-limiting dicarboxylic acid. The polyamide blocks having diamine chain ends originate, for example, from the condensation of polyamide precursors in the presence of a chain-limiting diamine.

The number-average molar mass Mn of the polyamide blocks is between 400 and 20 000 g/mol and preferably between 500 and 10 000 g/mol.

The polymers having polyamide blocks and polyether blocks can also comprise randomly distributed units.

Use may advantageously be made of three types of polyamide blocks.

According to a first type, the polyamide blocks originate from the condensation of a dicarboxylic acid, in particular those having from 4 to 20 carbon atoms, preferably those having from 6 to 18 carbon atoms, and of an aliphatic or aromatic diamine, in particular those having from 2 to 20 carbon atoms, preferably those having from 6 to 14 carbon atoms.

Mention may be made, as examples of dicarboxylic acids, of 1,4-cyclohexanedicarboxylic acid, butanedioic acid, adipic acid, azelaic acid, suberic acid, sebacic acid, dodecanedicarboxylic acid, octadecanedicarboxylic acid, terephthalic acid, isophthalic acid, but also dimerized fatty acids.

Mention may be made, as examples of diamines, of tetramethylenediamine, hexamethylenediamine, 1,10-decamethylene-diamine, dodecamethylenediamine, trimethylhexamethylenediamine, isomers of bis(4-aminocyclohexyl)methane (BACM), bis(3-methyl-4-aminocyclohexyl)methane (BMACM), and 2,2-bis(3-methyl-4-aminocyclohexyl)propane (BMACP), and di(para-aminocyclohexyl)methane (PACM), and isophoronediamine (IPDA), 2,6-bis(aminomethyl)norbornane (BAMN) and piperazine (Pip).

For example, PA 4.12, PA 4.14, PA 4.18, PA 6.10, PA 6.12, PA 6.14, PA 6.18, PA 9.12, PA 10.10, PA 10.12, PA 10.14 and PA 10.18 blocks are available.

According to a second type, the polyamide blocks result from the condensation of one or more α,ω-aminocarboxylic acids and/or of one or more lactams having from 6 to 12 carbon atoms in the presence of a dicarboxylic acid having from 4 to 12 carbon atoms or of a diamine. Mention may be made, as examples of lactams, of caprolactam, oenantholactam and lauryllactam. Mention may be made, as examples of α,ω-aminocarboxylic acids, of aminocaproic acid, 7-aminoheptanoic acid, 11-aminoundecanoic acid and 12-aminododecanoic acid.

Advantageously, the polyamide blocks of the second type are of polyamide 11, of polyamide 12 or of polyamide 6.

According to a third type, the polyamide blocks result from the condensation of at least one am-aminocarboxylic acid (or one lactam), at least one diamine and at least one dicarboxylic acid.

In this case, the polyamide PA blocks are prepared by polycondensation:
  of the linear aliphatic or aromatic diamine or diamines having X carbon atoms;
  of the dicarboxylic acid or acids having Y carbon atoms; and
  of the comonomer or comonomers {Z}, chosen from lactams and α,ω-aminocarboxylic acids having Z carbon atoms and equimolar mixtures of at least one diamine having X1 carbon atoms and of at least one dicarboxylic acid having Y1 carbon atoms, (X1, Y1) being different from (X, Y);
  said comonomer or comonomers {Z} being introduced in a proportion by weight ranging up to 50%, preferably up to 20% and more advantageously still up to 10%, with respect to the combined polyamide precursor monomers;

in the presence of a chain-limiting agent chosen from dicarboxylic acids.

Use is advantageously made, as chain-limiting agent, of the dicarboxylic acid having Y carbon atoms, which is introduced in excess with respect to the stoichiometry of the diamine or diamines.

According to an alternative form of this third type, the polyamide blocks result from the condensation of at least two α,ω-aminocarboxylic acids or of at least two lactams having from 6 to 12 carbon atoms or of a lactam and of an aminocarboxylic acid not having the same number of carbon atoms, in the optional presence of a chain-limiting agent. Mention may be made, as examples of aliphatic α,ω-aminocarboxylic acids, of aminocaproic acid, 7-aminoheptanoic acid, 11-aminoundecanoic acid and 12-amino-dodecanoic acid. Mention may be made, as examples of lactam, of caprolactam, oenantholactam and lauryllactam. Mention may be made, as examples of aliphatic diamines, of hexamethylenediamine, dodecamethylenediamine and trimethylhexamethylenediamine. Mention may be made, as example of cycloaliphatic diacids, of 1,4-cyclohexane-dicarboxylic acid. Mention may be made, as examples of aliphatic diacids, of butanedioic acid, adipic acid, azelaic acid, suberic acid, sebacic acid, dodecanedicarboxylic acid, dimerized fatty acids (these dimerized fatty acids preferably have a dimer content of at least 98%; preferably, they are hydrogenated; they are sold under the Pripol® trademark by Uniqema or under the Empol® trademark by Henkel) and polyoxyalkylene-α,ω-diacids. Mention may be made, as examples of aromatic diacids, of terephthalic acid (T) and isophthalic acid (I). Mention may be made, as examples of cycloaliphatic diamines, of the isomers of bis(4-aminocyclohexyl)methane (BACM), bis(3-methyl-4-aminocyclohexyl)methane (BMACM) and 2,2-bis(3-methyl-4-aminocyclohexyl)propane (BMACP), and di(para-aminocyclohexyl)methane (PACM). The other diamines commonly used can be isophoronediamine (IPDA), 2,6-bis(aminomethyl)norbornane (BAMN) and piperazine.

Mention may be made, as examples of polyamide blocks of the third type, of the following:
  6.6/6, in which 6.6 denotes hexamethylenediamine units condensed with adipic acid. 6 denotes units resulting from the condensation of caprolactam.
  6.6/6.10/11/12, in which 6.6 denotes hexamethylenediamine condensed with adipic acid. 6.10 denotes hexamethylenediamine condensed with sebacic acid. 11 denotes units resulting from the condensation of aminoundecanoic acid. 12 denotes units resulting from the condensation of lauryllactam.

The weight Mn of the polyether blocks is between 100 and 6000 g/mol and preferably between 200 and 3000 g/mol.

Preferably, the polymer comprises from 1 to 80% by weight of polyether blocks and from 20 to 99% by weight of polyamide blocks, preferably from 4 to 80% by weight of polyether blocks and from 20 to 96% by weight of polyamide blocks.

The polyether blocks consist of alkylene oxide units. These units can, for example, be ethylene oxide units, propylene oxide units or tetrahydrofuran units (which results in polytetramethylene glycol sequences). Use is thus made of PEG (polyethylene glycol) blocks, that is to say those consisting of ethylene oxide units, PPG (polypropylene glycol) blocks, that is to say those consisting of propylene oxide units, PO3G (polytrimethylene glycol) blocks, that is to say those consisting of trimethylene ether units (such copolymers with polytrimethylene ether blocks are described in the document U.S. Pat. No. 6,590,065), and PTMG blocks, that is to say those consisting of tetramethylene glycol units, also known as polytetrahydrofuran blocks. The PEBA copolymers can comprise, in their chain, several types of polyethers, it being possible for the copolyethers to be block or random copolyethers.

Use may also be made of blocks obtained by oxyethylation of bisphenols, such as, for example, bisphenol A. The latter products are described in Patent EP 613 919.

The polyether blocks can also consist of ethoxylated primary amines. Mention may be made, as examples of ethoxylated primary amines, of the products of formula:

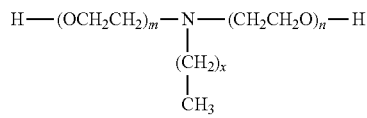

in which m and n are between 1 and 20 and x is between 8 and 18. These products are available commercially under the Noramox® tradename from CECA and under the Genamin® tradename from Clariant.

The flexible polyether blocks can comprise polyoxyalkylene blocks having $NH_2$ chain ends, it being possible for such blocks to be obtained by cyanoacetylation of α,ω-dihydroxylated aliphatic polyoxyalkylene blocks, known as polyether diols. More particularly, use may be made of Jeffamines (for example Jeffamine® D400, D2000, ED 2003 or XTJ 542, commercial products from Huntsman, also described in patent documents JP2004346274, JP2004352794 and EP 1 482 011).

The polyether diol blocks are either used as is and copolycondensed with polyamide blocks having carboxylic ends, or they are aminated in order to be converted into polyether diamines and condensed with polyamide blocks having carboxylic ends. The general method for the preparation in two stages of the PEBA copolymers having ester bonds between the PA blocks and the PE blocks is known and is described, for example, in French Patent FR 2 846 332. The general method for the preparation of the PEBA copolymers of the invention having amide bonds between the PA blocks and the PE blocks is known and is described, for example, in European Patent EP 1 482 011. The polyether blocks can also be mixed with polyamide precursors and a diacid chain-limiting agent in order to produce polymers having polyamide blocks and polyether blocks which have randomly distributed units (one-stage process).

Of course, the designation PEBA in the present description of the invention relates equally well to the Pebax® products sold by Arkema, to the Vestamid® products sold by Evonik, to the Grilamid® products sold by EMS, to the Kellaflex® products sold by DSM or to any other PEBA from other suppliers.

Advantageously, the PEBA copolymers have PA blocks of PA 6, of PA 11, of PA 12, of PA 6.12, of PA 6.6/6, of PA 10.10 and/or of PA 6.14, preferably PA 11 and/or PA 12 blocks; and PE blocks of PTMG, of PPG and/or of PO3G. The PEBAs based on PE blocks predominantly composed of PEG are to be placed in the range of the hydrophilic PEBAs. The PEBAs based on PE blocks predominantly composed of PTMG are to be placed in the range of the hydrophobic PEBAs.

Advantageously, the said PEBA used in the composition according to the invention is obtained, at least partially, from biobased starting materials.

The term "starting materials of renewable origin" or "biobased starting materials" is understood to mean substances which comprise biobased carbon or carbon of renewable origin. Specifically, unlike substances resulting from fossil materials, substances composed of renewable starting materials comprise $^{14}C$. The "content of carbon of renewable origin" or "content of biobased carbon" is determined by the application of Standards ASTM D 6866 (ASTM D 6866-06) and ASTM D 7026 (ASTM D 7026-04). By way of example, the PEBAs based on polyamide 11 originate at least in part from biobased starting materials and exhibit a content of biobased carbon of at least 1%, which corresponds to a $^{12}C/^{14}C$ isotopic ratio of at least $1.2\times10^{-14}$. Preferably, the PEBAs according to the invention comprise at least 50% by weight of biobased carbon with respect to the total weight of carbon, which corresponds to a $^{12}C/^{14}C$ isotopic ratio of at least $0.6\times10^{-12}$. This content is advantageously higher, in particular up to 100%, which corresponds to a $^{12}C/^{14}C$ isotopic ratio of $1.2\times10^{-12}$, in the case, for example, of PEBA having PA 11 blocks and PE blocks comprising PO3G, PTMG and/or PPG resulting from starting materials of renewable origin.

Use may also be made, as TPE for the material C2, of a copolyether-block-urethane (abbreviated to TPU) comprising a flexible poly(oxyalkylene) block and a polyurethane block. The polyurethane blocks can be obtained by reaction between a diisocyanate, a diol and, if necessary, a chain-extending agent. The flexible polyether blocks can be as described above in connection with the PEBAs.

The diisocyanate is in particular an aliphatic diisocyanate, such as hexamethylene diisocyanate (HMDI) or 2,2,4-trimethylhexamethylene diisocyanate; an alicyclic diisocyanate, such as 1,4-cyclohexane diisocyanate, 4,4'-dicycloalkylmethane diisocyanate or isophorone diisocyanate (IPDI); an aromatic diisocyanate, such as phenylene diisocyanate, tolylene diisocyanate (TDI) or 4,4'-diphenylmethane diisocyanate (MDI); an arylaliphatic diisocyanate, such as xylylene diisocyanate; and others. Use may also be made, as diisocyanate, of a compound having an alkyl group (for example, a methyl group) substituted on a main chain of the compound or of a ring. The above diisocyanates can be used alone or in combination.

Examples of the diol comprise a polyester diol [for example, a polyester diol (aliphatic polyester diol) derived from an aliphatic dicarboxylic acid component (for example, an aliphatic $C_{4-12}$ dicarboxylic acid, such as adipic acid), an aliphatic diol component (for example, an aliphatic $C_{2-12}$ diol, such as ethylene glycol, propylene glycol, butanediol or neopentyl glycol) and/or a lactone component (for example, a $C_{4-12}$ lactone, such as ε-caprolactone), for example a polyethylene adipate), a poly(1,4-butylene adipate), a poly(1,6-hexylene adipate) or a poly-ε-caprolactone], a polyether diol [for example, an aliphatic polyether diol, for example a poly($C_{2-4}$ oxyalkylene) glycol, such as a polyethylene glycol, a poly(oxytrimethylene) glycol, a polypropylene glycol or a polytetramethylene glycol (PTMG), and a poly(oxyalkylene) glycol block copolymer (for example, a PEG-PPG block copolymer), or an aromatic polyether diol, for example an addition product of an aromatic diol with an alkylene oxide, such as a bisphenol A—alkylene oxide (for example, an addition product of a $C_{2-4}$ alkylene oxide, such as ethylene oxide or propylene oxide)]; a polyesterether diol (a polyester diol obtained by using the polyether diol as part of a diol component); or a polycarbonate diol. This/these diol(s) can be used alone or in combination. Among these diols, the polyester diol or the polyether diol, such as polytetramethylene glycol, (for example a polyester diol) is used in many cases.

Use may be made, as chain-extending agent, of a glycol [for example, a short-chain glycol, for example a $C_{2-10}$ alkanediol, for example ethylene glycol, propylene glycol, 1,4-butanediol or 1,6-hexanediol; or a bishydroxyethoxybenzene (BHEB)] and in addition of a diamine [for example, an aliphatic diamine, such as a $C_{2-10}$ alkylenediamine, for example ethylenediamine, trimethylenediamine, tetramethylenediamine or hexamethylenediamine, an alicyclic diamine, such as isophoronediamine, or an aromatic diamine, such as phenylenediamine or xylylenediamine]. The chain-extending agent can be used alone or as a combination of several types of chain extenders.

The preferred thermoplastic polyurethane (TPU) is obtained by using a diol and a diisocyanate in substantially equivalent amounts. Alternatively, the polyisocyanate comprises a small amount of residual free (or unreacted) isocyanate, obtained by using an amount of diisocyanate which is slightly in excess with respect to the diol.

Preferably, use is made of a TPU obtained by using a diol [for example, a polyester diol or polyether dial], a diisocyanate and a glycol (for example, a short-chain glycol) as chain-extending agent. The TPU comprises a hard segment (hard block), which is composed of a polyurethane formed from a glycol and a diisocyanate, and a soft segment (soft block) composed of a polyether diol [for example, an aliphatic polyether diol (for example, a poly(oxyethylene) glycol)], a polyester diol (for example, an aliphatic polyester diol) or others. Mention may in particular be made, as examples of TPU, of the following elastomers: polyester urethane, polyester-ether urethane, polyether urethane, polycarbonate urethane and others as a function of the entity of the soft segment. Among TPUs, polyester urethane, polyester-ether urethane or polyether urethane elastomers and their mixtures are preferred. Furthermore, the number-average molecular weight of the polyether (polyoxyalkylene glycol) is preferably within the range from 100 to 10 000, preferably from 300 to 6000 and more preferably from 500 to 4000.

The material C2 can comprise just one TPU or several of these TPUs as a mixture.

Use may also be made, as TPE for the material C2, of a copolyether-block-ester (abbreviated to COPE) comprising a flexible poly(oxyalkylene) block and a polyester block. The polyester block can be obtained by polycondensation by esterification of a carboxylic acid, such as isophthalic acid or terephthalic acid or a biobased carboxylic acid (such as furandicarboxylic acid), with a glycol, such as ethylene glycol, trimethylene glycol, propylene glycol or tetramethylene glycol. The flexible polyether blocks can be as described above in the description of the PEBAs.

Another subject-matter of the present invention is the use of a PEBA in a process of direct adhesion between two TPE materials for increasing the peel strength between these materials, characterized in that the PEBA is a copolymer according to the invention described above.

A subject-matter of the present invention is in particular a composition based on copolymer according to the invention described above, the composition being characterized in that it comprises:
from 51 to 99.9% by weight of the said copolymer,
from 0.1 to 49% by weight of at least one other component chosen from: PEBAs with a different composition and/or with a different flexural modulus from that of the copolymer, PAs, POFs, COPEs, TPUs, reinforcing fillers and/or fibres, in particular of glass or of carbon, colourants, UV absorbers, antioxidants, in particular phenolic antioxidants or antioxidants based on phosphorus or based on sulphur, light stabilizers of hindered amine or HALS type, and their mixtures.

A further subject-matter of the present invention is a process for direct adhesion of a copolymer material (C1) according to the invention with a TPE copolymer material (C2), C2 being of identical composition to and having the same flexural modulus as C1, or being of identical composition to but having a different flexural modulus from C1, or C2 is a TPE material chosen from: PEBAs of different compositions from that of the said copolymer C1, COPEs and/or TPUs, the process according to the invention being characterized in that the assembling is carried out by a process comprising the heating of at least one of the two copolymer materials C1 and/or C2, so as to cause one material to adhere to the other.

According to an advantageous embodiment of the process of the invention, the material C1 is melted or softened under heating and the molten material C1 is brought into contact with at least a portion of the material C2 of the series of the thermoplastic polyurethanes TPUs in order to cause the two materials to adhere.

According to a second advantageous embodiment of the process of the invention, the material C2 of the series of the thermoplastic polyurethanes TPUs is melted or softened under heating and the molten material C2 is brought into contact with at least a portion of the material C1 in order to cause the two materials to adhere.

According to a third advantageous embodiment of the process of the invention, the material C1 and the material C2 of the series of the TPUs are independently melted or softened under heating and the molten material C1 is brought into contact with at least a portion of the molten material C2 in order to cause the two materials to adhere.

Advantageously, in the assembling in process according to the invention, the material C1 and the material C2 are assembled by a direct adhesion process chosen from: overmoulding, hot pressing, coextrusion, thermoforming, injection moulding, extrusion moulding, blow moulding and their mixtures, preferably by overmoulding one material over the other, preferably by overmoulding the copolymer according to the invention over a TPE and preferably by overmoulding the copolymer over a TPU.

Advantageously, the assembling temperature of the direct adhesion process according to the invention is within the range from 220 to 300° C., preferably from 250 to 290° C. and preferably from 270 to 290° C.

Such a process can, for example, be carried out by joining the materials C1 and C2 in a moulding process, by injection moulding, in particular two-material injection, two-colour injection, multicolour, two-shot injection or co-injection moulding. It is also possible to overmould a flexible material on a rigid material, with a melting point Tm and/or glass transition temperature Tg which are greater than those of the flexible material. The PEBA according to the invention can, in addition, be overmoulded on a metal insert. Other conventional processes can be used: thermoforming, hot moulding in a moulding machine, insert moulding, sandwich injection moulding, extrusion moulding, in particular coextrusion moulding, injection-blow moulding and other methods for processing TPE materials. A person skilled in the art chooses the type of injection moulding machine according to the type of mould, of insert and of materials to be injected.

According to a specific embodiment of the hot moulding in a moulding machine, two materials C1 and C2 in the form of granules, powder or any other form are charged to a metal mould. According to another embodiment, two materials C1 and C2, in the form of premoulded articles, are charged to a metal mould. According also to a According also to an embodiment of the insert injection moulding, a moulded composite article can be produced by: moulding either one of the materials C1 and C2 using a process such as injection moulding or extrusion moulding, in particular of sheet or of film, then the insertion or the forming in a metal mould of the article thus moulded and then the injection of the other of the materials C1 and C2, not yet moulded, into a space or a cavity between the moulded article and the metal mould. In the insert injection moulding, the moulded article which has to be inserted into the metal mould is preferably preheated.

Another subject-matter of the present invention is a composite article comprising at least two polymer materials which adhere directly to one another, one with a composition according to the invention described above and the other made of TPE chosen from: identical PEBA (with a different flexural modulus from that of the copolymer), PEBA of different composition from that of the said copolymer, COPE and/or TPU.

Another subject-matter of the present invention is the use of an article according to the invention in the manufacture of sports equipment, of a component of footwear, in particular of sports shoe, shoe sole, in particular crampon, component of a ski, in particular of an Alpine, freeride, telemark or crosscountry ski boot, of snow shoes or of a ski shell, of a metal device, of a transmission belt, as antistatic additive, as waterproof-breathable film, as support for active molecules, as colouring agent, as welding agent, as decorative element and/or as additive for polyamide.

The article can in particular be at least a part portion chosen from motor vehicle parts, textiles, woven or nonwoven materials, clothing, footwear, sports equipment, recreational equipment, electronic objects, computer hardware, healthcare equipment, spectacles, industrial additives, packaging and household products. Mention may in particular be made of dashboards, air bags, soles for sports shoes, golf balls, tubes for medical use, catheters, angioplasty balloons, peristaltic belts, the belts of conveyor belts, waterproof-breathable products, synthetic leather and/or skin, thermoplastic films or packaging films.

EXAMPLES

The following examples illustrate the invention without limiting it. The standards used in the examples also correspond to those used more generally to characterize the invention in the description or the claims.

Materials Used:

In the examples which follow:

PEBA 1: PA 12-PTMG (Mn: 400-1000)

PEBA 1 is a copolymer having PA 12 blocks and PTMG blocks with respective number-average molecular weights (Mn) 400-100.

PEBA 2: PA 6.10-PTMG (2500-650)

PEBA 2 is a copolymer according to the invention having PA 6.10 blocks and PTMG blocks with respective number-average molecular weights (Mn) 2500-650.

PEBA 3: PA 11-PTMG (1000-1000)

PEBA 3 is a copolymer having PA 11 blocks and PTMG blocks with respective number-average molecular weights (Mn) 1000-1000.

TPU 1 is an aromatic TPU having ether (PTMG) blocks, with a Shore A hardness of 95 and with a flexural modulus of 53 MPa, of Elastollan® 1195A trademark (BASF).

TPU 64 Shore D is an aromatic TPU having ether (PTMG) blocks with a Shore A hardness of 95, of Elastollan® 1164D trademark.

Example 1—Comparison of the Peel Strengths (kg/cm) After Overmoulding Different PEBAs on TPU or PEBA Insert A peel test according to Standard ISO 11339 was carried out on the products overmoulded at different injection moulding temperatures.

The results of these tests are given in Table 1.

The adhesion of different compositions of PEBAs on TPU insert or on PEBA insert, after direct adhesion by overmoulding at different injection moulding temperatures, is compared in the following Table 1.

TABLE 1

| Insert | Grade | Peel strengths (kg/cm) for different injection moulding temperatures (° C.) | | | |
|---|---|---|---|---|---|
| | | 250 | 260 | 270 | 280 |
| TPU 1 | PEBA 1 | 7 | | 3 | |
| | PEBA 2 | 14 | 14 | 18 | |
| | PEBA 1 + PEBA 2 (50/50) | | | 8 | |
| | PEBA 2 + PEBA 3 (30/70) | 12 | | | 14 |
| PEBA 2 | PEBA 2 | | | 9.3 | |
| PEBA 2 + PEBA 3 (30/70) | PEBA 2 + PEBA 3 (30/70) | 13 | | | 12 |

It is found that PEBA 2 (PA 6.12-PTMG) according to the invention exhibits an excellent adhesion to TPU, characterized by a peel strength of 14 kg/cm obtained for an overmoulding temperature of 250° C.

Furthermore, a composition according to the invention comprising 50% by weight of PEBA 1 and 50% by weight of PEBA 2 exhibits a markedly improved direct adhesion to TPU (8 kg/cm) with respect to the comparative PEBA 1 alone (3 kg/cm), after overmoulding on a TPU insert at 270° C. The overmoulding of PEBA 2 on itself at 270° C. also results in an adhesion in accordance with that of the invention, with a peel strength of greater than 9 kg/cm.

Likewise, the dry blend mixture of PEBA 2 (30% by weight)+PEBA 3 (70% by weight) exhibits a direct adhesion of at least 12 kg/cm to TPU or to the moulded product itself (obtained from the same dry blend mixture).

Example 2—Comparison of the Mechanical Properties

Flexural Modulus (MPa) According to Standard ISO 178:
TPU 64 Shore D: 270 MPa
PEBA 1: 285 MPa
PEBA 2: 320 MPa Cold stiffening: measured by the change in the E' modulus (MPa) as a function of temperature T or by the change in the E'(T)/E'(23° C.) ratio as a function of the temperature over the range −40° C. to +23° C. (Graph of FIG. 1):

The lower the value of this ratio, the less the stiffness of the product changes.

As is shown in Graphs 1 and 2, PEBA 2 according to the invention, like PEBA 1, exhibits a lower cold stiffening between −40 and 23° C. than TPU 64 Shore D.

Tan δ: Damping Factor/Liveliness Test at Ambient Temperature (23° C.)

The liveliness test consists in stressing the end of a test specimen (see the following figure) and in observing the frequency of the oscillations and the time necessary for the damping of these oscillations. The movement of the end of the material is reflected by a sine wave (of the $y=y_o e^{-\alpha t} \cos(\overline{\omega} t)$ type), the amplitude of which decreases over time.

The higher the frequency and the lower the damping, the more the material is regarded as lively.

The liveliness index L is defined by $$L = \frac{f}{\tan(\delta)}$$

with f the oscillation frequency,
tan δ the damping factor calculated from the parameters α and $\omega = 2\pi/T$:

$$\tan \delta = \frac{2\alpha\overline{\omega}}{\overline{\omega}^2 + \alpha^2}$$

The tests were carried out at 23° C. Two levels of deformation were applied: 1% and 3%, and the liveliness results are shown in the following Table 2:

TABLE 2

| 1% def. (23° C.) | PEBA 2 | PEBA 1 | 3% def. (23° C.) | PEBA 2 | PEBA 1 |
|---|---|---|---|---|---|
| Frequency (Hz) | 43 ± 1 | 51 ± 1 | Frequency (Hz) | 124 ± 4 | 141 ± 1 |
| Tan δ | 0.117 | 0.118 | Tan δ | 0.147 | 0.136 |

The frequency of oscillation of PEBA 1 is slightly higher than that of PEBA 2. The tan δ values are substantially the same for PEBA 1 and PEBA 2. Likewise, the liveliness indices of PEBA 1 and PEBA 2 are relatively similar. These results show that PEBA 2 according to the invention exhibits a dynamic behaviour with a spring effect, and thus a good "liveliness".

Notched (V) Charpy Impact Test

The resilience $R_{ch}$ (kJ/m$^2$) at 23° C. of the 3 TPEs is measured according to Standard ISO 179 1eA. The results obtained are shown in the following Table 3:

TABLE 3

| | TPU 64 Shore D | PEBA 2 according to the invention | PEBA 1 |
|---|---|---|---|
| $R_{ch}$ (kJ/m$^2$) V notch, 23° C. | Nonbreaking | Nonbreaking | Nonbreaking |

At 23° C., PEBA 1, PEBA 2 and TPU 64 Shore D have a similar behaviour; in the three cases, the product does not break.

Fatigue Behaviour—Ross Flex Test (Standard ASTM D1052)

The Ross flex test is a fatigue test used to evaluate the longevity of the materials when the latter are repeatedly stressed in flexion (frequency of 1.7 cycles/s). The test makes it possible to say if the product breaks or not after n cycles (generally n=150 000).

Typically, the deformation applied is of the order of 5% for a test specimen of 2 mm stressed with an angle of 60°. This deformation depends on the thickness of the material and on the angle of stress.

At an unvarying radius of curvature, the more the thickness t increases, the more the deformation increases. At an unvarying thickness, the more the radius of curvature R decreases, the more the deformation increases.

The deformation applied to the test specimen is given by:

$$\varepsilon = \frac{t}{2(R - t/2)}$$

Angle of stress: 60°
Test specimen width: 20 mm
Temperature: −10° C.
Number of cycles: 150 000
Frequency: 100 cycles/min.

PEBA 1 and PEBA 2 exhibit a good fatigue strength since they pass the 150 000 cycles.

Furthermore, PEBA 2 passes the 150 000 cycles after having been subjected to a heat treatment under the following conditions: 7 days at a temperature of 70° C. and a humidity of 95%.

Comparison of the Density of Different TPEs

The density is measured according to Standard ISO 1183:
TPU 64 Shore D: 1.24
PEBA 1: 1.01
PEBA 2: 1.06

The invention claimed is:

1. A composite article comprising at least two polymer materials which adhere directly to one another, wherein:
    a first polymer material is made of a copolymer having polyamide PA blocks and polyether PE blocks (PEBA), in which the number of carbons of the diamine in the PA blocks is within the range from 6 to 14, and the number of carbons of the diacid in the PA blocks is within the range from 6 to 18, and
    a second polymer material is made of thermoplastic elastomer (TPE) chosen from identical PEBA with a flexural modulus different from that of the copolymer, PEBA of composition different from that of the said copolymer, copolyether-block-ester (COPE) and/or copolyether-block-urethane (TPU).

2. The composite article according to claim 1, in which the number of carbons of the diamine in the PA blocks is 6 or 10, and the number of carbons of the diacid in the PA blocks is 10 or 12.

3. The composite article according to claim 1, in which PE is chosen from polytetramethylene glycol (PTMG), polypropylene glycol (PPG), polytrimethylene glycol (PO3G) and/or polyethylene glycol (PEG).

4. The composite article according to claim 1, in which the said copolymer comprises from 51 to 90% by weight of polyamide blocks and respectively from 49 to 10% by weight of polyether blocks, with respect to the total weight of copolymer.

5. The composite article according to claim 1, in which the number-average molecular weight (Mn) of the PA blocks is within the range from 500 to 10,000.

6. The composite article according to claim 1, in which the number-average molecular weight (Mn) of the PE blocks is within the range from 400 to 1000.

7. The composite article according to claim 1, wherein the composite article is configured for use in the manufacture of sports equipment, as a component of footwear, as a medical device, as a transmission belt, as an antistatic additive, as waterproof-breathable film, as support for active molecules, as colouring agent, as welding agent, as decorative element and/or as additive for polyamide.

* * * * *